United States Statutory Invention Registration [19]

[11] Reg. Number: H399

Johnson et al. [43] Published: Jan. 5, 1988

[54] WATER-TO-WATER HEAT PIPE EXCHANGER

[75] Inventors: Charles H. Johnson, Blacksburg; Estel E. Ogle, Christiansburg, both of Va.

[73] Assignee: The United States of America as represented by the Secretary of the Army, Washington, D.C.

[21] Appl. No.: 920,019

[22] Filed: Oct. 10, 1986

[51] Int. Cl.[4] ..... F28D 15/00

[52] U.S. Cl. ..... 165/47; 165/104.14

*Primary Examiner*—Harold J. Tudor

*Attorney, Agent, or Firm*—Anthony T. Lane; Harold H. Card, Jr.; Michael C. Sachs

[57] ABSTRACT

This invention encompasses a water-to-water heat-pipe heat exchanger having a vessel, at least one partition dividing said vessel into at least two compartments, at least one of said compartments further having a fresh water input means and a fresh water output means, and a different compartment having a hot waste water input means and a hot waste water output means, and a plurality of heat exchange pipes for transferring heat between said compartments. The invention is generally in heat exchangers, and for dissipating heat in any system by transferring heat from a hot to a cool substance. Such a system may be used to alleviate the excessive heat generated during thermonuclear reactions, wherein cool water is exposed to a vessel containing hot waste water to cool the temperature of the waste water, such that no mixing or interchange of hot and cool water occurs. Alternatively, the heat exchanger described herein may be used to conserve heat generated in a system whereby one or more components utilized therein must be heated prior to chemical reaction. For example, wherever a hot solvent system is used to extract or purify a contaminant or other compound, the heat contained in the waste solvent can be captured with the heat exchanger to heat additional solvent or a different reagent in the reaction sequence if necessary.

11 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WATER-TO-WATER HEAT PIPE EXCHANGER

GOVERNMENTAL INTEREST

The U.S. Government has rights in this invention pursuant to contract no. DAAA-21-86-M-1076 awarded by the Department of the Army. The invention described herein may be made, used, or licensed by or for the Government for Governmental purposes without the payment of any royalties thereon.

BACKGROUND OF THE INVENTION

The present worldwide rate of consumption of a finite quantity of fossil fuel has initiated Applicants' far reaching investigations into improved energy systems for energy conservation. One promising approach to energy conservation is the use of high thermal conductance potential heat pipes for the recovery of heat lost in effluent processing waste streams. The water to water heat pipe heat exchanger as described herein presents a novel, highly efficient, and versatile approach to energy conservation and a solution to various heat transfer problems.

This invention relates generally to heat exchangers, useful for dissipating heat in any system by transferring heat from a hot to a cool substance. Such a system may be used for instance to alleviate the excessive heat generated during thermonuclear reactions, wherein cool water is exposed to a vessel containing hot waste water to cool the temperature of the waste water, such that no mixing or interchange of hot and cool water occurs.

Similarly, exothermal chemical reactions which generate excessive heat or reactions requiring heat may be effectively controlled using a heat exchanger, whereby cool water is exposed to a reaction vessel containing hot reagents to dissipate the heat generated during the chemical process. In this manner, if the reaction vessel is cooled, the reaction rate may be controlled by reducing the temperature of the reagents to slow the reaction. Alternately, any end products or by-products of the chemical reaction having an excessively high temperature as a result of the reaction process may be cooled prior to discharge of the end product or by-product into a purifiation system for environmental discharge or prior to discharge directly into the environment.

Alternatively, the heat exchanger described herein may be used to conserve heat generated in a system whereby one or more components utilized therein must be heated prior to chemical reaction. For example, wherever a hot solvent system is used to extract or purify a contaminant or other compound, the heat contained in the waste solvent can be captured with the heat exchanger to heat additional solvent or a different reagent in the reaction sequence if necessary.

SUMMARY OF THE INVENTION

This invention encompasses a water to water heat pipe heat exchanger having a vessel, at least one partition dividing said vessel into at least two compartments, at least one of said compartments further having a fresh water input means and a fresh water output means, and a different compartment having a hot waste water input means and a hot waste water output means, and plurality of heat exchange pipes for transferring heat between said compartments.

OBJECTS OF THE INVENTION

Accordingly, it is one object of this invention to provide a heat exchanger useful for capturing excess heat from hot waste water so as to conserve energy and shorten the heating time for fresh water prior to reaction.

A further object of the invention is to provide a water to water heat pipe heat exchanger useful for extracting heat from a hot waste water or hot process water source, and transferring the heat captured to fresh process water.

A further object of the invention is to provide a water to water heat pipe heat exchanger useful for reducing the temperature to hot waste water prior to discharge, so as render the hot waste water suitable for discharge into the environment, thereby alleviating thermal pollution.

A further object of the invention is to create a water to water heat pipe heat exchanger which is easy to clean and inspect.

BRIEF DESCRIPTION OF THE DRAWING

The preferred embodiment of the invention as disclosed herein will be described in greater detail below with reference to the accompanying drawings, wherein.

DETAILED DESCRIPTION

Figure 1:
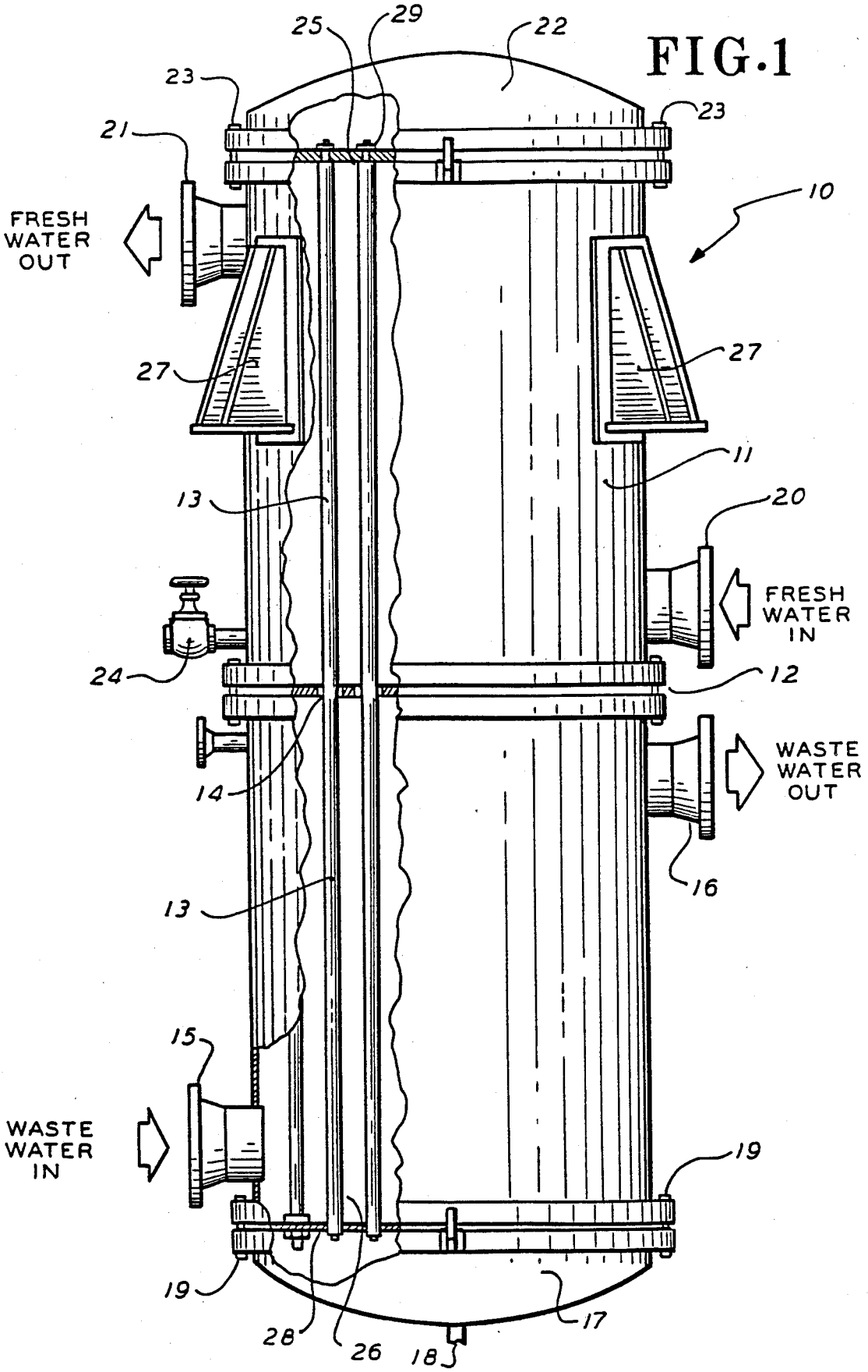
FIG. 1 is a side view of the water to water heat pipe heat exchanger, partially cut away.
Figure 2:
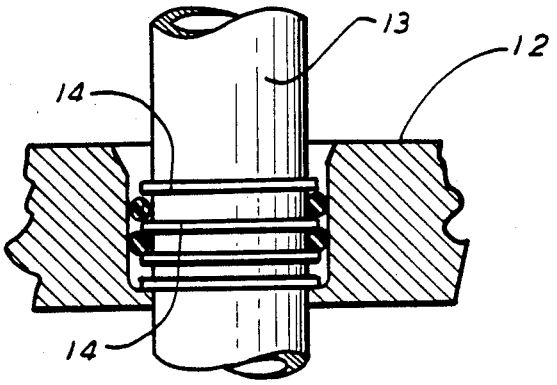
FIG. 2 is a perspective view of the heat pipe-plate intersection.

Referring in detail to the drawings, the heat pipe heat exchanger, designated generally as 10 may be comprised of a vessel 11 which is divided into at least two compartments by a plate 12. The plate may be constructed so as to accommodate a plurality of heat exchange pipes 13 which intersect and pass through the plate and each junction between the plate and each heat pipe is sealed with a seal means 14.

The vessel 11 may be of any size or shape sufficient to accommodate a plate within its interior. The overall size of the vessel should be large enough to contain a quantity of hot waste water and a similar quantity of fresh process water sufficient to extract in large measure the excessive heat from the hot waste water or hot process water source and transfer that heat to the fresh water. This transfer of heat may be utilized prior to discharge of the hot waste water or process water into the environment to alleviate thermal pollution at the point of discharge. In this manner the receiving body of water, such as a lake or river is not warmed excessively by said discharge, thereby minimizing the overall environmental impact which can alter or adversely impact the ecosystem.

Alternatively, the hot waste water or hot process water contained in the vessel may be utilized to preheat chemical ingredients or fresh water for a chemical manufacturing process, thereby conserving energy.

The vessel described herein may be comprised of any appropriate material having the requisite strength and rigidity; it should ideally be relatively non-reactive with hot waste water or hot process water.

For purposes of the preferred embodiment of the Applicants' invention, a steel vessel is ideal in that it is inert, can withstand high temperature and rapid changes in temperature without cracking, is extremely durable and relatively inexpensive.

Plate 12 may be located within the confines of vessel 11, such that it divides the interior of vessel 11 into at least two compartments. The plate similar to the vessel may be comprised of any substance which is heat conductive, durable and inert; a steel plate is ideal for use in the preferred embodiment.

One of the at least two compartments formed in the vessel by the plate is designated a waste water compartment and a different compartment is designated the fresh water compartment. These designations are useful for descriptive purposes, and are not intended to limit the materials which may be introduced into each compartment. For example, the waste water compartment within the vessel may contain hot waste water, hot process water, cold waste water or a hot or cold non-aqueous substance which is produced or used during the chemical reaction sequence. The fresh water compartment may similarly contain hot or cold fresh water or a hot or cold non-aqueous reagent which is to be preheated for purposes of a subsequent manufacturing process using the heat exchanger. As such, the designations waste water compartment and fresh water compartment serve merely to designate the contents which are typically introduced into and removed from the water to water heat pipe heat exchanger vessel compartments.

The waste water compartment may have a waste water input means 15 suitable for the introduction of waste water into the waste water compartment. The waste water input means may be a pipe, hose, pipe connection or any other similar means. For discharge, the waste water compartment may utilize a waste water output means 16 suitable for the release or output of waste water having a reduced temperature after the heat exchanger transfers heat to the fresh water compartment and to the fresh process water contained therein. As described with respect to the waste water input means, the waste water output means may be any means suitable for removing cooled waste water or similar effluent from the waste water compartment and conveying it for further treatment or for ultimate discharge.

The waste water compartment may be formed in part by a bottom plate 17 which seals the waste water compartment and renders it suitable for containing waste water. The waste water compartment bottom plate may be bolted to the sides of the vessel with bolts 19 and sealed to prevent leakage from the compartment. Further, the waste water compartment bottom plate may have a waste water drain 18 for residual waste water. The drain may be opened and the bolts disconnected to remove residual waste water and to open the compartment for cleaning, inspection or repair purposes.

As described with respect to the waste water compartment, the fresh water compartment may utilize a fresh water input means 20 as well as a fresh output means 21. The fresh water input means and fresh output means may be any means suitable for introducing fresh process water into the compartment and removal of fresh water from the compartment. The fresh process water may be preheated using the heat exchanger for purposes of rendering the process water suitable for further chemical or manufacturing processes, or warmed in its heat absorbing capacity for purposes of reducing the temperature of the hot waste water contained in the waste water compartment to enable said waste water to be discharged or further treated prior to discharge. The fresh water input means and the fresh water output means may be pipes, hoses, pipe couplings or similar means suitable for the introduction or removal of fresh process water from the fresh water compartment of the heat exchanger vessel.

The fresh water compartment may be sealed with a top plate 22 which may be bolted using bolts 23 or otherwise attached to the vessel. Fresh water compartment drain 24 is useful for removing residual fresh process water from the fresh water compartment. By removing residual fresh water from the fresh water compartment and further by removing the fresh water compartment top plate, the interior of the fresh water compartment may be cleaned, inspected or repaired as necessary. To facilitate installation of the vessel, mounting support lugs 27 are located on the outer surface of the vessel.

Contained within the interior of the vessel is a plurality of heat exchange pipes 13. Said heat exchange pipes may run essentially the length of the interior of the vessel, and each pipe has a first end 25 and a second end 26. In the preferred embodiment of the invention, the first end of the heat exchange pipes and essentially half the overall length of the pipes is contained within the fresh water compartment. The other half of the length and the second end of the heat exchange pipes is ideally contained within the waste water compartment. The heat exchange pipes pass through plate 12 and the junction at which each said heat exchange pipe passes through plate 12 is sealed with a sealing means 14 to prevent mixing and contamination of the contents of the fresh water compartment with the contents of the waste water compartment. A representative example of a sealing means is a double-O-ring seal. The heat exchange pipes are aligned parallel to each other and held secure within the vessel by a top support plate 27. Further, if necessary, each pipe of the plurality of heat exchange pipes may be additionally supported by a bottom support plate 28.

The heat exchange pipes may be interconnected to each other to form a closed system and sealed to prevent mixing or contamination between the heat exchange pipe contents, the waste water compartment contents and the fresh water compartment contents. Alternatively, the interior of the heat exchange pipes may be open to enable the contents of either (but not both) the waste water compartment or the fresh water compartment to flow into and through said heat exchange pipes.

The heat exchange pipes may be arranged in a second alternative configuration wherein at least one heat exchange pipe is open to the waste water compartment, and at least one different heat exchange pipe is open to the fresh water compartment. The pipe or pipes open to the waste water compartment are therefore used to contain and transport waste water through the fresh water compartment without permitting mixture or contamination, thereby permitting effective heat transfer. Similarly, the pipe or pipes open to the fresh water compartment contain and transport fresh water through the waste water compartment without permitting mixture or contamination, thereby permitting effective heat transfer.

If the plurality of heat exchange pipes defines a coolant system which is not open to either the waste water or the fresh water compartment, the heat exchange pipes may be charged with a coolant or a heat transferring substance, to render the water to water heat pipe heat exchanger optimally effective. For example, the plurality of heat exchange pipes may be filled or charged with an ammonia solution which effectively transfers heat from the waste water compartment to the fresh water compartment, thus enabling the recapture and transfer of heat to preheat the fresh process water contained in the fresh water compartment.

The primary mechanism of heat transfer in the evaporator and condenser sections of the heat pipe is conductive evaporation and condensation. Conduction of heat across the liquid-saturated wick is accompanied by a radial temperature gradient in the liquid. In the evaporator section, radial heat flux is accompanied by an increase in vapor pressure over the liquid pressure, which in turn creates vapor bubbles at the wick-pipe interface in the evaporator section. This results in "hot spots" in the wick and obstruction of the circulation of liquid. Hence, there is a heat flux limit for the evaporator which may be termed the "boiling limit".

Figure 3:
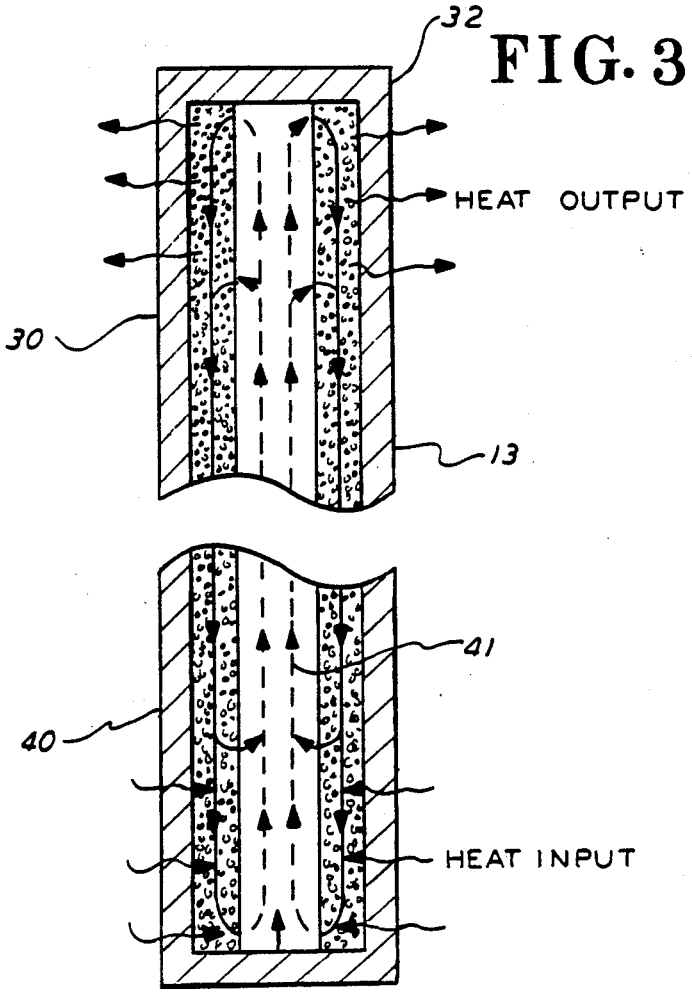
FIG. 3 is a cross-sectional schematic view of a heat pipe.

As shown in FIG. 3, heat in the evaporator section 40 of each pipe causes fluid to evaporate and enter the vapor core 41 within the interior of the heat pipe. Vapor flows within the vapor core in the direction of the condenser section 30, where upon said vapor condenses to a fluid. Said fluid enters wick 32, which effectively transfers heat to raise the temperature in the condenser section 30, and simultaneously reduce the vapor temperature, thereby causing the release of heat.

Inside each heat pipe, the working fluid is in equilibrium with its own vapor. When heat is applied along the evaporator section of the pipe, the local temperature within the pipe is raised slightly and part of the working fluid evaporates. Because of the saturation condition inside the pipe, this temperature difference results in a difference in vapor pressure which in turn, causes vapor to flow from the heated section to the cooler section of the pipe through said vapor core. The vapor condenses in the condenser section, thereby releasing and transferring its latent heat. Return of the condensate occurs through the wick which provides a flow path for the liquid back to the evaporator section of the pipe. Upon condensation, the fluid travels by capillary action back toward the evaporator section, where the elevated temperature causes fluid evaporation into the vapor core.

When the system is used to conserve heat, the highest possible working fluid circulation is required to obtain maximum heat transport capability of the heat pipe. This internal heat transport is limited by capilliary limitation, entrainment limitation, boiling limitation and sonic limitation as described below.

Capillary limitation is described with respect to steady state operation of the system, wherein the working fluid in the vapor phase within the heat pipe flows continuously from the heated section, or the "evaporator section" to the cooler end, or the "condensor section" of the heat pipe, and returns to the evaporator section in the liquid phase. As the vapor flows from the evaporator section to the condenser section, there exists a vapor pressure gradient. For pressure equilibrium to exist, it is necessary for the pressure at the liquid side of the liquid-vapor interface be different from that at the vapor side except at one point where the difference is zero. This pressure difference between the two sides of the liquid-vapor interface is the capillary pressure and is established by the menisci that form in the wick at the liquid-vapor interface.

In general, the magnitude of the liquid-vapor pressure difference increases with heat; this causes increased capillary pressure with increased heat. However, there exists a maximum capillary pressure that can be developed for the liquid-wick arrangement described herein which limits the amount of heat which can be effectively transferred. For the heat pipe to operate without drying out the wick, the required capillary pressure should not exceed the maximum possible pressure at any point along the heat pipe. This limitation on heat transport capability is known as the capillary limitation.

An "entrainment limitation" of the system is caused by the movement of vapor and liquid in opposite directions in a heat pipe. A shear force exists at the liquid-vapor interface which minimizes mixing. When the vapor velocity is too high, liquid becomes entrained in the vapor causing an increase in fluid circulation until the liquid return system cannot accommodate the increased fluid flow. When this occurs, the entrainment limit has been reached and the wick at the evaporator section dries out, and the heat pipe ceases to function.

Where each heat pipe contains a constant core diameter, the vapor stream is caused to accelerate and decelerate by the addition of vapor in the evaporator section and removal of vapor in the condenser section of the heat pipe. Velocity variations result from a variable mass flow through a constant area in the heat pipe. which is a function of heat input at the evaporator section and condensation rate at the condenser section. A maximum axial heat transport rate and a fixed axial temperature drop along the evaporator section of the heat pipe may cause "choked flow". This choked flow condition is a fundamental limit on the axial vapor flow in each heat pipe. Choked flow is not necessarily detrimental; it merely represents the limitation of heat transport by the heat pipe.

The ideal fluid contained within the heat pipe is chosen based upon the operating vapor temperature range. Several working fluids exist that perform within the temperature range for any particular application. For Applicants' preferred embodiment, ammonia is the preferred working fluid that meets the necessary criteria, and is selected based upon its stability to thermal degradation at the maximum working temperature of 93° C. (200° F.) at a corresponding pressure of approximately 1000 psig. The vapor pressure of ammonia is sufficiently high to minimize entrainment of the liquid ammonia in the gaseous ammonia vapor space within the heat pipe at the vapor velocities normally encountered. Further, the latent heat of vaporization for ammonia is relatively high which translates into a high heat transport factor. The saturation point of ammonia is within the working range of temperature and pressure in this system and the critical temperature and pressure are well above normal operating limits in heat pipes. The thermal conductivity of ammonia is sufficiently high to retard the undesirable effect of boiling at the wick/wall interface. The viscosity of ammonia is sufficiently low to minimize resistance to fluid flow. Surface tension, an important parameter in capillary pumping capacity, is typically not a critical parameter since the heat pipe heat exchanger may operate in the gravity-assist mode.

The preferred embodiment of the invention can further be described with respect to the preheating of fresh process water by utilizing hot waste water as a heat source for a nitrocellulose purification process. During the purification process, a nitrocellulose slurry in water may be steam heated from 55° F. to 212° F. Several times during the processing phases, hot waste water is drained from the facility and pumped into the hot waste water compartment of the heat pipe heat exchanger through the waste water input means. Simultaneously, fresh process water is introduced into the fresh water compartment through the fresh water input means. The heat exchanger extracts from the hot waste water sufficient heat to raise the temperature of the fresh process water to 98° F., thus saving energy in bringing the fresh process water temperature up to 212° F. By pumping hot waste water and fresh process water through the heat pipe heat exchanger, as much as $4.8 \times 10^6$ BTU/hr may be transferred.

While the preferred embodiment of the invention may have been described in detail in respect to one particular embodiment or embodiments, various alternative embodiments will be obvious from the teachings herein. Consequently, the scope of this application is not to be limited by the contents of this disclosure alone, and it is contemplated that all alternative embodiments of the invention including substitutions and obvious modifications of parts thereof are deemed included herein.

We claim:

1. A heat exchanger comprising:

a vessel;

at least one partition dividing the interior of said vessel into at least two compartments, at least one of said compartments being a waste water compartment and having a waste water input means and a waste water output means, and a different compartment being a fresh process water compartment and having a fresh water input means and a fresh water output means; and a plurality of heat exchange pipe for transferring heat between said compartments. each of said heat exchange pipes having a first end and a second end.

2. The heat exchanger of claim 1 wherein the first end of each of said heat exchange pipes is located in one of said compartments and the second end of each of said heat exchange pipes is located in a different compartment.

3. The heat exchanger of claim 2 wherein said heat exchange pipes each extends through at least one opening in said partition.

4. The heat exchanger of claim 3 wherein said at least one opening is sealed around each said heat exchange pipe with at least one double O-ring seal.

5. The heat exchanger of claim 2 wherein the heat exchange pipes contain a heat transferable substance.

6. The heat exchanger of claim 5 wherein the plurality of heat exchange pipes contains ammonia.

7. The heat exchanger of claim 5 wherein the heat transferable substance contained in said heat exchange pipes is identical to the fresh process water contained in the fresh water compartment.

8. The heat exchanger of claim 5 wherein the heat transferable substance is identical to the waste water contained in the waste water compartment.

9. The heat exchanger of claim 1 wherein said at least one partition is further comprised of a steel plate.

10. The heat exchanger of claim 8 wherein said heat exchange pipes are connected to said vessel by a support plate.

11. The heat exchanger of claim 10 wherein each of said exchange pipes is straight.

* * * * *